(12) United States Patent
Mayers et al.

(10) Patent No.: US 10,973,351 B2
(45) Date of Patent: Apr. 13, 2021

(54) ADJUSTABLE LENGTH TABLECLOTH RETAINING DEVICE

(71) Applicants: Robert L Mayers, San Marcos, CA (US); Scott R Mayers, San Marcos, CA (US)

(72) Inventors: Robert L Mayers, San Marcos, CA (US); Scott R Mayers, San Marcos, CA (US)

( * ) Notice: Subject to any disclaimer, the term of this patent is extended or adjusted under 35 U.S.C. 154(b) by 0 days.

(21) Appl. No.: 16/364,178

(22) Filed: Mar. 26, 2019

(65) Prior Publication Data
US 2020/0305622 A1 Oct. 1, 2020

Related U.S. Application Data

(60) Provisional application No. 62/648,299, filed on Mar. 26, 2018.

(51) Int. Cl.
| | |
|---|---|
| *A44B 11/00* | (2006.01) |
| *A47G 21/16* | (2006.01) |
| *A47C 31/11* | (2006.01) |
| *F16B 2/08* | (2006.01) |

(52) U.S. Cl.
CPC .......... *A47G 21/167* (2013.01); *A44B 11/006* (2013.01); *A47C 31/11* (2013.01); *F16B 2/08* (2013.01); *Y10T 24/4093* (2015.01); *Y10T 24/4736* (2015.01)

(58) Field of Classification Search
CPC ..... A47G 21/167; A44B 11/006; A44B 11/02; A44B 11/04; A44B 11/06; Y10T 24/1412; Y10T 24/4086; Y10T 24/4093; Y10T 24/1408; Y10T 24/1406
See application file for complete search history.

(56) References Cited

U.S. PATENT DOCUMENTS

| | | | | |
|---|---|---|---|---|
| 401,283 A | | 4/1889 | Knapp | |
| 784,736 A | * | 3/1905 | Evans | A44B 11/12 24/170 |
| 1,285,027 A | * | 11/1918 | Butts | A44B 11/04 24/321 |
| 1,397,800 A | | 11/1921 | DeMattos | |
| 2,058,931 A | * | 10/1936 | Williams | A44B 11/04 24/200 |
| 3,290,743 A | | 10/1965 | Hanson | |
| 3,327,361 A | * | 6/1967 | Mathison | A44B 11/04 24/198 |
| 4,158,905 A | | 6/1979 | O'Leary | 24/81 T |
| 4,520,533 A | * | 6/1985 | Kasai | A41F 15/002 24/198 |

(Continued)

*Primary Examiner* — Robert Sandy
*Assistant Examiner* — Michael S Lee
(74) *Attorney, Agent, or Firm* — David B. Waller

(57) ABSTRACT

The present invention comprises a closed loop elastic strap having at least a primary thickness, a width and an adjustable length. The length is adjustable by feeding the elastic strap through a buckle with one end of the elastic strap attached to a loop with another portion of the elastic strap fed through the same loop and the other end of the elastic strap attached to a portion of the same buckle.

The closed loop elastic strap can be stretched around (but not limited to) the end of a picnic table to hold a tablecloth in place or around the top of (but not limited to) a beach chair or lounge chair to hold a towel in place during windy or adverse conditions.

1 Claim, 5 Drawing Sheets

(56) References Cited

U.S. PATENT DOCUMENTS

| | | | | |
|---|---|---|---|---|
| 4,844,540 | A | 7/1989 | Pegram | 297/229 |
| 5,289,619 | A | 3/1994 | Pileggi | 24/306 |
| 5,441,789 | A | 8/1995 | Walker | 428/78 |
| 5,960,520 | A | 10/1999 | Conway | 24/306 |
| 6,149,234 | A | 11/2000 | Daniels | 297/229 |
| 6,351,874 | B1 * | 3/2002 | Suggs | A44B 11/006 24/265 BC |
| 6,381,812 | B1 | 5/2002 | Crider | 24/306 |
| 6,575,533 | B1 | 6/2003 | Kicos | 297/397 |
| 6,655,737 | B2 | 12/2003 | Hyduk | 297/229 |
| D556,562 | S | 12/2007 | Seifert | D8/395 |
| 7,370,588 | B2 | 5/2008 | Franco | A47B 13/08 |
| D600,542 | S | 9/2009 | Zemel | D8/395 |
| 7,757,614 | B2 | 7/2010 | Nurse-Bey | 108/90 |
| 7,905,039 | B2 | 3/2011 | Karovic | 40/320 |
| 8,807,503 | B2 | 8/2014 | Zavala | 248/309.4 |
| D766,712 | S | 9/2016 | Bertram | D8/394 |
| D794,437 | S | 8/2017 | Zinser | D8/395 |
| D796,944 | S | 9/2017 | Davis | D8/394 |
| 9,897,409 | B2 | 1/2018 | Mroz | A47G 9/06 |
| 2004/0226147 | A1 * | 11/2004 | Fildan | A44B 11/04 24/302 |
| 2015/0237938 | A1 * | 8/2015 | O'Neill | B60P 7/0823 2/322 |
| 2016/0338504 | A1 | 11/2016 | Bellini | A47C 31/11 |

* cited by examiner

FIG. 1
FIG. 1A
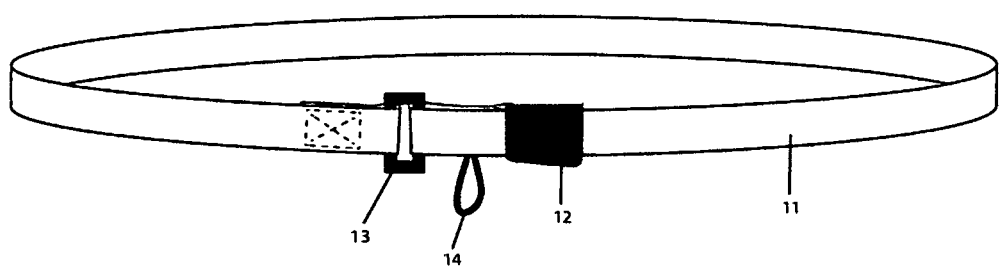
FIG. 1B
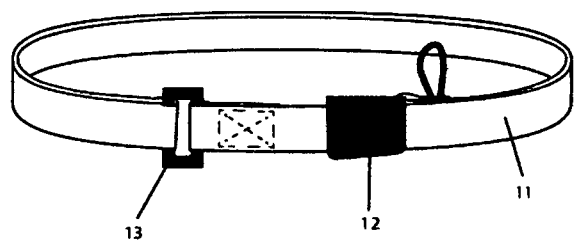
FIG. 1C
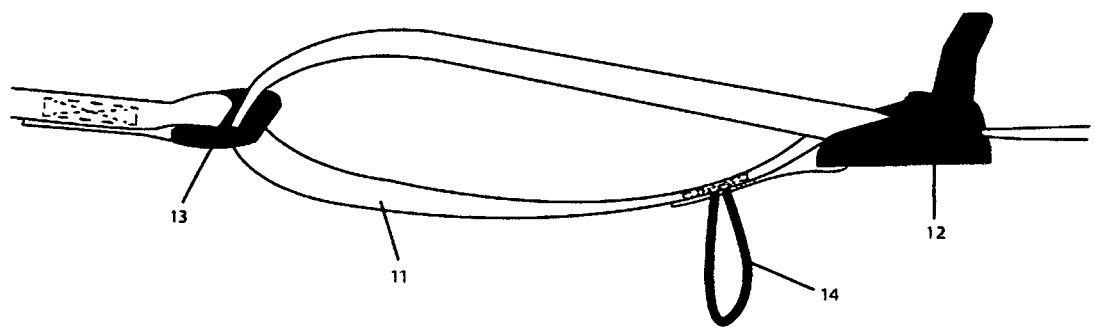

FIG. 3
FIG. 3A
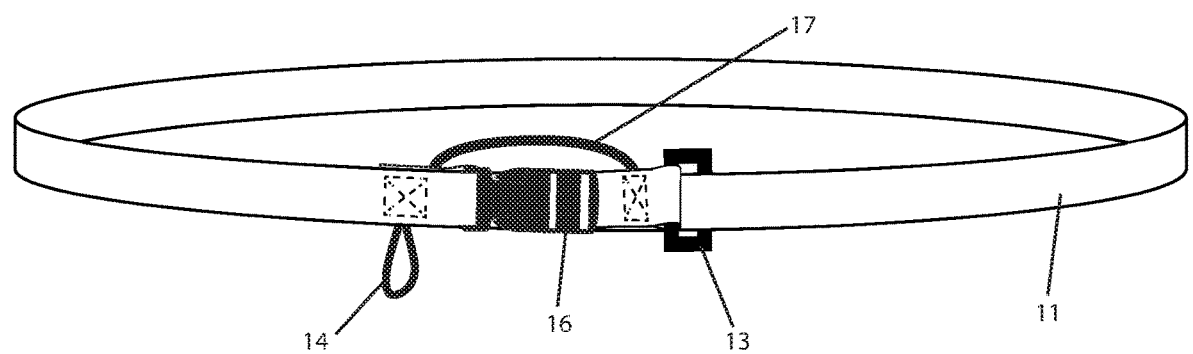
FIG. 3B
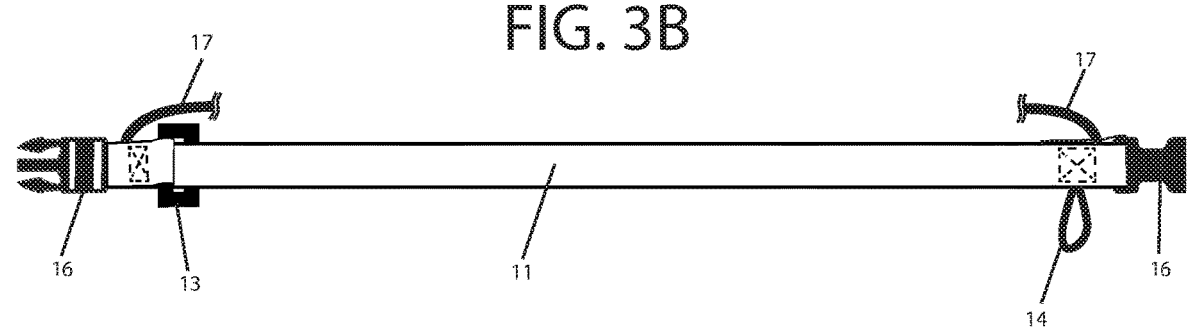

ADJUSTABLE LENGTH TABLECLOTH RETAINING DEVICE

RELATED U.S. APPLICATION DATA

Provisional Patent Application No. 62/648,299 filed on Mar. 26, 2018

Current Intl. Cl . . . A47B 13/08 (2006.01); A47C 21/16 (2006.01); A47C 31/11 (2006.01); F16B 2/02 (2006.01); F16B 2/20 (2006.01); A47C 7/62 (2006.01); A47C 5/06 (2006.01); A44B 11/06 (2006.01)

Current U.S. CL
CPC . . . A47G 21/167; A47B 13/08; A47G 21/16; A47G 21/00; A47C 7/62; A47C 31/11; A47C 21/02; A47C 21/022; A44B 11/06; A47C 7/38; A44B 11/005; A47C 1/14; A47C 1/143

USPC . . . 108/90; 297/397; 248/309.4; 40/320; 297/229; 24/306

Field of Search . . . A47G 21/167; A47G 21/16; A47C 21/022; A47C 5/06; 108/90; 24/306; 24/300; 24/442; 297/229; A44B 11/005; A47C 7/62; A47C 7/22; A47C 31/11; 248/309.4; 297/397; 40/320

FIELD OF THE INVENTION

The present invention relates to a novel adjustable length elastic strap and will be called an "elastic closed loop strap" throughout this application. Closed loop signifies both ends of the elastic strap are attached to a component of the present invention. The elastic closed loop strap will be used for placement around the ends of (but not limited to) a picnic table to hold a tablecloth in place or around the top of (but not limited to) a chair such as a beach chair, pool chair or chaise lounge to hold a towel in place. One elastic closed loop strap is adjustable to most sizes of tables or chairs.

More particularly, one end of the elastic closed loop strap is permanently attached to a loop (known as and will be call a "common loop" throughout this application and made of Acetal, Nylon, other plastic, metal or fabric material). The other end of the elastic closed loop strap is permanently attached to a buckle and will be called "buckle" throughout this application. This buckle can be a jam lever, cam lever, ladderlock, tensionlock, side squeeze or other buckles made of acetal, nylon, other plastic or metal materials. The elastic closed loop strap also passes through the same buckle and the same common loop which allows for length adjustment with no ends of the strap hanging freely.

BACKGROUND

There are several products on the market that will hold a tablecloth on a table and other products that can keep a towel on a chair. None have been found to be as versatile to do both as the present invention.

The present invention works with both tables and chairs along with many other uses. It is very light weight and compact in size, ideal for traveling.

One adjustable size works on most large and small tables as well as most sizes of chairs.

Many of the tablecloth holders are clips that expand over the edges of the table but do not fit many of the thicker outdoor picnic or campground tables.

Other tablecloth bands or straps have a snap in type buckle that when released can fly across the table and may cause injury. They can be cumbersome when trying to connect the buckle on large tables Some tablecloth bands or straps use hook and loop as an attachment device that when released can fly across the table possibly injuring someone. They can also be cumbersome when trying to connect each end on large tables.

Weights or heavy articles can be put on the corners of the table to hold down the tablecloth but they can interfere with using the end of the table.

Decorative weights can be purchased that clip on each corner of the tablecloth but they are heavy and bulky for storage and travel.

Decorative clamps can be used for holding a towel on a beach chair or lounge chair but they are also bulky for traveling compared to the present invention. They are not practical for use on tables.

The present invention's adjustability in size works on both tables and chairs.

BRIEF SUMMARY OF THE INVENTION

The present invention comprises an elastic closed loop strap having at least a primary thickness, a width and an adjustable length. One end of an elastic strap is attached to (but not limited to) a buckle while the other end of the strap is fed through (but not limited to) a common loop. Then the elastic strap is fed through another portion of the same buckle with the other end of the elastic strap attached to the same common loop. The elastic strap makes a complete circumference with no loose ends resulting in a closed loop system. This allows the strap to be adjustable by opening the lever or releasing the tension on the buckle and sliding the elastic strap to adjust the circumference of the strap to fit the size needed for the table or chair. The lever or tension on the buckle is then locked in place to keep the elastic strap from sliding through the buckle.

The elastic closed loop strap can be stretched around (but not limited to) the end of a table to hold a tablecloth in place during windy conditions or because of shifting articles on the table.

The elastic closed loop strap can be stretched around (but not limited to) the top of a beach chair or lounge chair to hold a towel in place during windy conditions or because of body movement on the chair. During movement in and out of the chairs the towels are prone to shift with body movement. This present invention will keep the towel in place.

BRIEF DESCRIPTION OF THE DRAWINGS

The present invention is illustrated as an example and is not limited by the figures of the accompanying drawings:

FIG. 1 depicts a perspective view of one example of the present invention with an elastic closed loop strap with a buckle (jam buckle or cam buckle) and (but not limited to) a common loop. FIG. 1A depicts the present invention adjusted fully open but not stretched. Fig. B depicts the same example of the present invention but adjusted to the smallest size. FIG. 1C depicts a detail view of the present inventions shown in FIGS. 1A and 1B.

FIG. 3 depicts a perspective view of one example of the present invention with an elastic closed loop strap with a buckle (side squeeze buckle) and (but not limited to) a common loop. When used with (but not limited to) the side squeeze buckle, a secondary smaller tether strap will be used to keep the buckle from fully separating so it releases but does not fly apart. FIG. 3A is adjusted fully open and FIG. 3B the buckle is released

DETAILED DESCRIPTION

Figure 2:
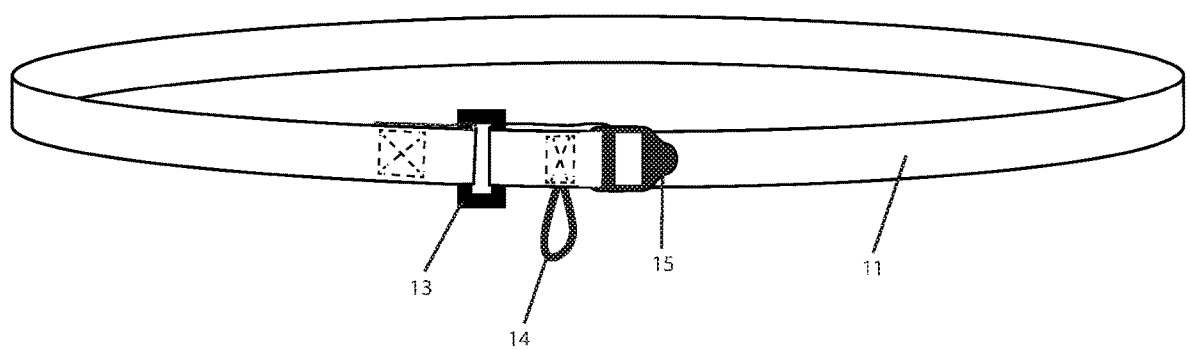
FIG. 2 depicts a perspective view of one example of the present invention with an elastic closed loop strap adjusted fully open with a buckle (ladderlock buckle or tensionlock buckle) and (but not limited to) a common loop.
Figure 4:
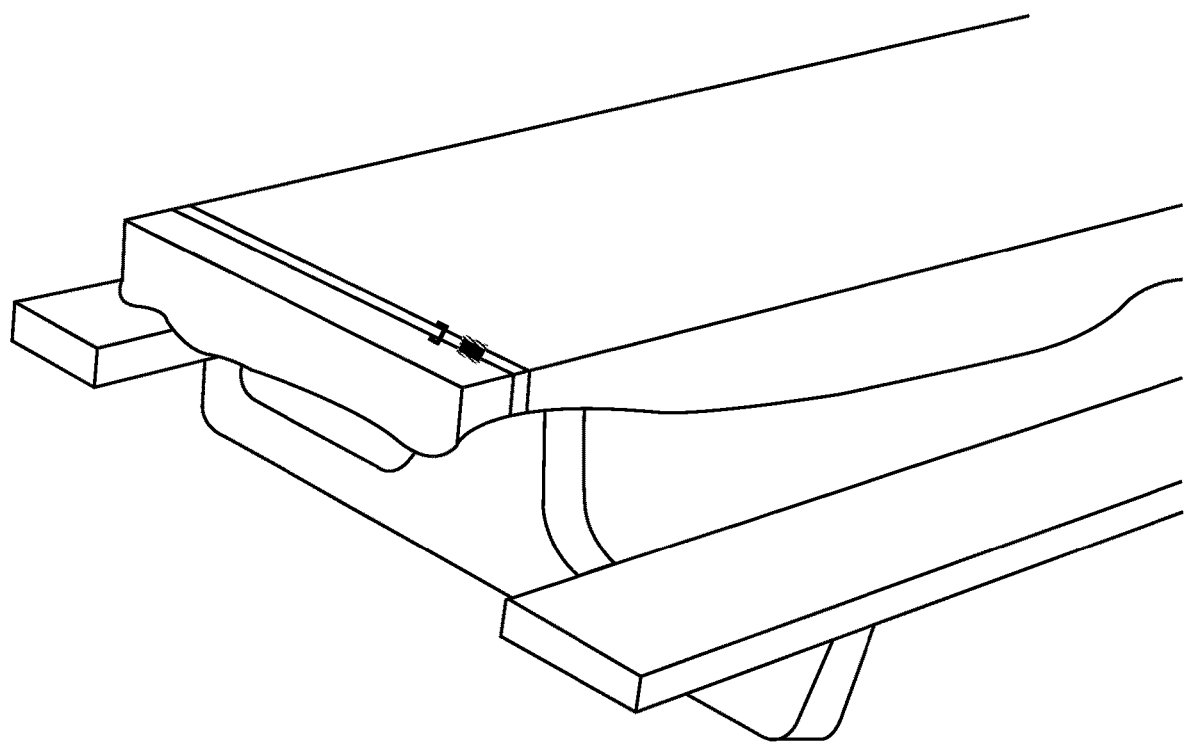
FIG. 4 illustrates the present invention being used over a tablecloth on one end of a picnic table. The elastic closed loop strap is shown with the common loop and buckle on the top of the tablecloth and the table. In normal use the common loop and the buckle can both be placed on the underside of the table so they do not interfere with items on the top of the tablecloth.
Figure 5:
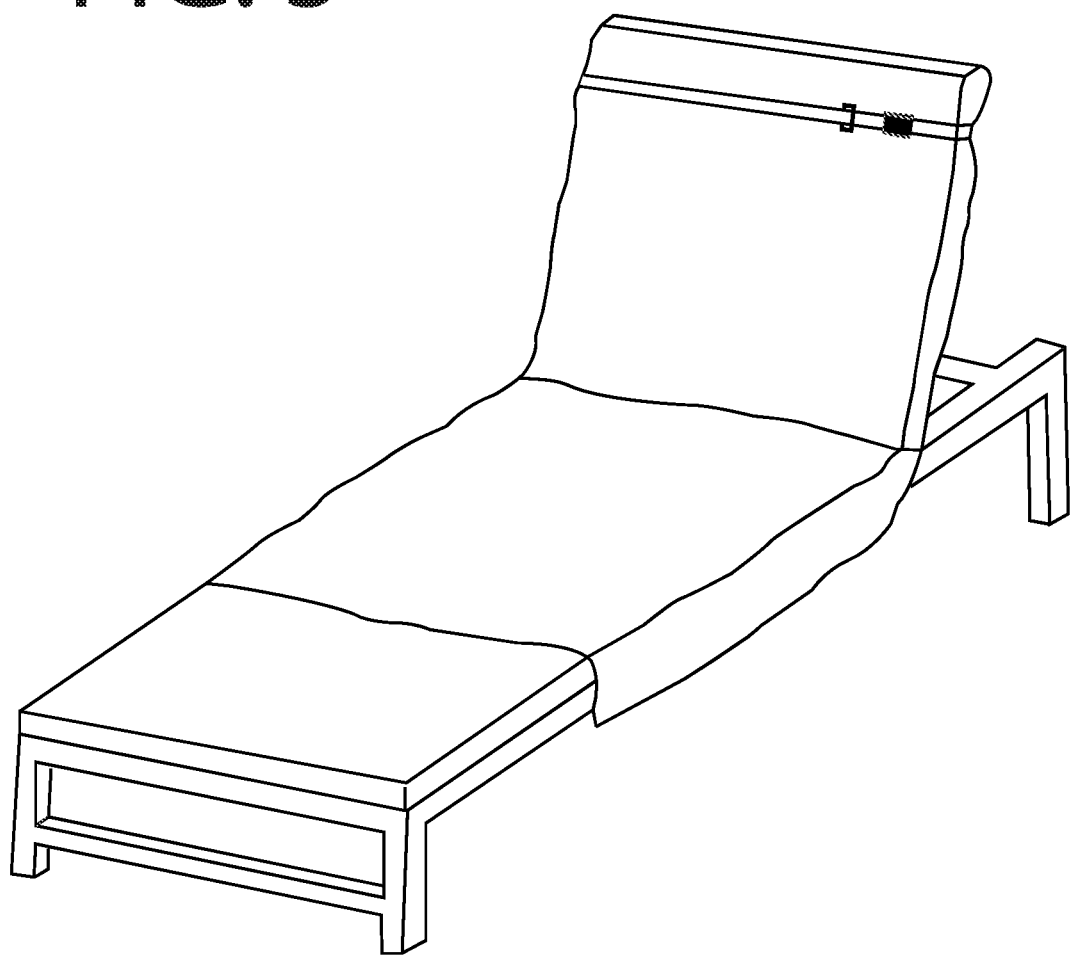
FIG. 5 illustrates the present invention being used over a beach towel on the top headrest part of chaise lounge chair. The elastic closed loop strap is shown with the common loop and buckle on the front side of the beach towel and the chair. In normal use the common loop and the buckle can both be placed on the backside of the chair so they do not interfere with the person sitting on the chair.

The object of the present invention is to retain a tablecloth on a table or a towel on a chair during (but not limited to) windy conditions. The present invention comprises an elastic closed loop strap 10 having at least a primary thickness, a width and an adjustable length.

When using a jam buckle 12 or cam buckle 12 on a table to hold a tablecloth the length of the elastic closed loop strap 10 is adjusted by releasing the lever on the buckle 12 and sliding the elastic strap 11 through the buckle 12 until a strap length of approximately two thirds the width of the table is achieved with the elastic not stretched (relaxed). Then the lever on the buckle 12 is compressed to hold the elastic closed loop strap 10 in place so the length does not change until the lever on the buckle 12 is released again to change the length. The elastic closed loop strap 10 is then stretched to fit over the end of the tablecloth and table to fit tight enough to hold the tablecloth in place. The common loop 13 and the buckle 12 can both be placed on the underside of the table so they do not interfere with items on the top of the tablecloth. A second elastic closed loop strap 10 can be used in the same manner to fit over the other end of the tablecloth. By using the lever on the buckle 12 the elastic closed loop strap 10 can be adjusted tighter or looser per the users preference. A unique feature is the use of (but not limited to) a common loop 13 to hold the end of the elastic strap 11 in place and keep it from hanging freely. Another unique feature is the optional use of a smaller elastic band 14 attached to the elastic strap 11 near the buckle 12 to be used for holding the elastic closed loop strap 10 when rolled or folded during transit or storage.

When using (but not limited to) a ladderlock buckle 15, tensionlock buckle 15 or side release buckle 16 on a table to hold a tablecloth the length of the elastic closed loop strap 10 is adjusted by releasing the tension on the buckle 15,16 and sliding the elastic strap 11 through the buckle 15,16 until a strap length of approximately two thirds the width of the table is achieved with the elastic not stretched (relaxed). Then the tension on the buckle 15,16 is replaced to hold the elastic closed loop strap 10 in place so the length does not change until the tension on the buckle 15,16 is released again to change the length. The elastic closed loop strap 10 is then stretched to fit over the end of the tablecloth and table to fit tight enough to hold the tablecloth in place. The common loop 13 and the buckle 15,16 can both be placed on the underside of the table so they do not interfere with items on the top of the tablecloth. A second elastic closed loop strap 10 can be used in the same manner to fit over the other end of the tablecloth. By releasing the tension on the buckle 15,16 the elastic closed loop strap 10 can be adjusted tighter or looser per the user's preference. A unique feature is the use of (but not limited to) a common loop 13 to hold the end of the elastic strap 11 in place and keep it from hanging freely. Another unique feature is the optional use of a smaller elastic band 14 attached to the elastic strap 11 near the buckle 15,16 to be used for holding the elastic closed loop strap 10 when rolled or folded during transit or storage. A third feature is the use of a tether strap 17 to be attached to each side of (but not limited to) the side squeeze buckle.

When using a jam buckle 12 or cam buckle 12 on (but not limited to) a chaise lounge chair or beach chair to hold a towel the length of the elastic closed loop strap 10 is adjusted by releasing the lever on the buckle 12 and sliding the elastic strap 11 through the buckle 12 until a strap length of approximately two thirds the width of the chair is achieved with the elastic not stretched (relaxed). Then the lever on the buckle 12 is compressed to hold the elastic closed loop strap 10 in place so the length does not change until the lever on the buckle 12 is released again to change the length. The elastic closed loop strap 10 is then stretched to fit over the top of the beach towel or pool towel on a chair and to fit tight enough to hold the towel in place. By using the lever on the buckle 12 the elastic closed loop strap 10 can be adjusted tighter or looser per the users preference. A unique feature is the use of (but not limited to) a common loop 13 to hold the end of the elastic strap 11 in place and keep it from hanging freely. Another unique feature is the optional use of a smaller elastic band 14 attached to the elastic strap 11 near the buckle 12 to be used for holding the elastic closed loop strap 10 when rolled or folded during transit or storage.

When using (but not limited to) a ladderlock buckle 15, tensionlock buckle 15 or side release buckle 16 on (but not limited to) a chaise lounge chair or beach chair to hold a towel the length of the elastic closed loop strap 10 is adjusted by releasing the tension on the buckle 15,16 and sliding the elastic strap 11 through the buckle 15,16 until a strap length of approximately two thirds the width of the chair is achieved with the elastic not stretched (relaxed). Then the tension on the buckle 15,16 is replaced to hold the elastic closed loop strap 10 in place so the length does not change until the tension on the buckle 15,16 is released again to change the length. The elastic closed loop strap 10 is then stretched to fit over the top of the beach towel or pool towel on a chair and to fit tight enough to hold the towel in place. By releasing the tension on the buckle 15,16 the elastic closed loop strap 10 can be adjusted tighter or looser per the user's preference. A unique feature is the use of (but not limited to) a common loop 13 to hold the end of the elastic strap 11 in place and keep it from hanging freely. Another unique feature is the optional use of a smaller elastic band 14 attached to the elastic strap 11 near the buckle 15,16 to be used for holding the elastic closed loop strap 10 when rolled or folded during transit or storage. A third feature is the use of a tether strap 17 to be attached to each side of (but not limited to) the side squeeze buckle 16.

For many other uses the length of the elastic closed loop strap 10 is adjusted by releasing the lever or tension on the buckle 12,15,16 and sliding the elastic strap 11 through the buckle 12,15,16 until a strap length of approximately two thirds the width of the item is achieved with the elastic not stretched (relaxed). Then the lever or tension on the buckle 12,15,16 is compressed or replaced to hold the elastic closed loop strap 10 in place so the length does not change until the lever or tension on the buckle 12,15,16 is released again to change the length. The elastic closed loop strap 10 is then stretched to fit over the width of the item and to fit tight enough to hold that item in place. By using the lever or releasing the tension on the buckle 12,15,16 the elastic closed loop strap 10 can be adjusted tighter or looser per the users preference. A unique feature is the use of (but not limited to) a common loop 13 to hold the end of the elastic strap 11 in place and keep it from hanging freely. Another unique feature is the optional use of a smaller elastic band 14 attached to the elastic strap 11 near the buckle to be used for holding the elastic closed loop strap 10 when rolled or folded during transit or storage.

One end of the elastic closed loop strap 10 is permanently attached to the common loop 13 and the other end of the elastic closed loop strap 10 is permanently attached to the buckle 12,15,16. The elastic closed loop strap 10 also passes through the same buckle 12,15,16 and the same common loop 13 which allows for length adjustment and no ends of the elastic closed loop strap 10 hanging freely.

A unique feature of the present invention is the use of (but not limited to) the common loop 13 used in conjunction with the buckle 12,15,16 to make a closed loop system where the common loop 13 keeps the end of the elastic closed loop strap 10 from hanging loose. Another unique feature is the optional use of a smaller elastic band 14 attached to the elastic strap 11 near the buckle 12,15,16 to be used for holding the elastic closed loop strap 10 when rolled or folded during transit or storage.

When used with (but not limited to) the side release buckle 16 a secondary smaller tether strap 17 will be used to keep the side release buckle 16 from fully separating so it releases but does not fly apart. The tether strap 17 can be made of a stretchable elastic material or a non-stretchable material and can allow some small amount of separation of the buckle parts. The tether strap 17 can be permanently attached to each side of the buckle 16 or the tether strap 17 can have a detachable connection.

What is claimed is:

1. An adjustable length elastic retainer strap comprising:

an elastic strap forming a permanently closed loop, wherein said elastic strap having a first end and a second end;

a buckle having a forward end and a back end;

a loop affixed to said second end of said elastic strap, wherein said first end of said elastic strap is drawn through said forward end of said buckle and through said loop, and affixed to said back end of said buckle forming a permanently closed loop of said elastic strap; and an elastic band affixed to said elastic strap near said buckle for holding said adjustable length elastic retainer strap when rolled or folded during transit or storage.

* * * * *